US010005690B2

(12) United States Patent
Wiest et al.

(10) Patent No.: US 10,005,690 B2
(45) Date of Patent: *Jun. 26, 2018

(54) FOAMS MADE OF AMORPHOUS HOLLOW SPHERES AND METHODS OF MANUFACTURE THEREOF

(71) Applicant: The United States of America, as represented by the Secretary of the Navy, Washington, DC (US)

(72) Inventors: Aaron Wiest, Norco, CA (US); Craig Andrew MacDougall, Norco, CA (US); Robert Dale Conner, Oak Hills, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 266 days.

This patent is subject to a terminal disclaimer.

(21) Appl. No.: 14/790,348

(22) Filed: Jul. 2, 2015

(65) Prior Publication Data

US 2016/0001475 A1    Jan. 7, 2016

Related U.S. Application Data

(62) Division of application No. 13/428,740, filed on Mar. 23, 2012, now Pat. No. 9,102,087.
(Continued)

(51) Int. Cl.
*B29C 70/66* (2006.01)
*C03B 19/08* (2006.01)
(Continued)

(52) U.S. Cl.
CPC .......... *C03B 19/08* (2013.01); *B29C 44/3403* (2013.01); *B29C 44/3461* (2013.01);
(Continued)

(58) Field of Classification Search
CPC ............ B29C 44/3403; B29C 44/3461; B29C 44/445; B29C 66/00145; B29C 66/73772;
(Continued)

(56) References Cited

U.S. PATENT DOCUMENTS 2,907,072 A    10/1959  Georg
3,248,464 A    4/1966   Telkes
(Continued)

OTHER PUBLICATIONS

Ashby "The properties of foams and lattices", Phil. Trans. R. Soc. A, 2006, vol. 364, pp. 15-30, Month of Publication Unknown.
(Continued)

*Primary Examiner* — Michael A Tolin
(74) *Attorney, Agent, or Firm* — Christopher A. Monsey

(57) ABSTRACT

Novel cellular solids and foams from amorphous materials with a glass transition temperature ($T_g$) and methods of forming such materials are provided. In particular, foams are formed by expanding or compressing hollow spheres made of a high strength amorphous material, which is defined as a material having high strength characteristics, but also possessing a glass transition within a confined space. Using such a method, it has been unexpectedly found that it is possible to make cellular structures, including both open and closed cell foams, with customizable properties from materials that have been inaccessible with conventional methods. Moreover, based on calculations high specific strengths and stiffnesses are expected.

22 Claims, 11 Drawing Sheets

Heat to $T > T_g$ $P_{ext} < P_{int}$

Related U.S. Application Data

(60) Provisional application No. 61/466,784, filed on Mar. 23, 2011.

(51) Int. Cl.

| | |
|---|---|
| *C03C 11/00* | (2006.01) |
| *B29C 44/34* | (2006.01) |
| *B29C 44/44* | (2006.01) |
| *C03B 19/10* | (2006.01) |
| *C03B 23/20* | (2006.01) |
| *C22C 45/00* | (2006.01) |

(52) U.S. Cl.
CPC ............ *B29C 44/445* (2013.01); *B29C 70/66* (2013.01); *C03B 19/107* (2013.01); *C03B 23/20* (2013.01); *C03C 11/002* (2013.01); *C22C 45/00* (2013.01); *B32B 2266/06* (2013.01)

(58) Field of Classification Search
CPC ........ B29C 67/222; B29C 70/66; B01J 13/02; B01J 13/04; B22F 3/1112; C03B 19/08; C03B 19/107; C03B 19/1075; C03B 23/00; C03C 11/002; C03C 11/007; C03C 27/00; C22C 45/00; C22C 45/10
See application file for complete search history.

(56) References Cited

U.S. PATENT DOCUMENTS

| | | | |
|---|---|---|---|
| 3,773,475 | A | 11/1973 | Madden |
| 4,133,854 | A | 1/1979 | Hendricks |
| 4,257,799 | A | 3/1981 | Rosencwaig et al. |
| 4,298,382 | A | 11/1981 | Stempin et al. |
| 4,327,154 | A | 4/1982 | Rossmann |
| 4,415,512 | A | 11/1983 | Torobin |
| 4,449,901 | A | 5/1984 | Wang et al. |
| 4,548,767 | A | 10/1985 | Hendricks |
| 4,643,854 | A | 2/1987 | Kendall et al. |
| 4,925,740 | A | 5/1990 | Norris et al. |
| 5,260,002 | A | 11/1993 | Wang |
| 2008/0121316 | A1 | 5/2008 | Duan et al. |

OTHER PUBLICATIONS

Ashby et al., "Metal Foams: A Design Guide", Butterworth-Heinemann, 2000, 263 pgs, Month of Publication Unknown.
Ashby et al., "Metal foams: A survey", Science in China (Series B), Dec. 2003, 46(6), pp. 521-532.
Boonyongmaneerat et al., "Mechanical properties of reticulated aluminum foams with electrodeposited Ni-W coatings", Scripta Materialia, 2008, vol. 59, pp. 336-339, Month of Publication Unknown.
Boonyongmaneerat et al., "Ni-Mo-Cr Foams Processed by Casting Replication of Sodium Aluminate Preforms", Advanced Engineering materials, 2008, vol. 10, No. 4, pp. 379-383, Month of Publication Unknown.
Brothers et al., "Porous and Foamed Amorphous Metals", MRS Bulletin, Aug. 2007, vol. 32, pp. 639-643.
Conner et al., "Shear bands and cracking of metallic glass plates in bending", Journal of Applied Physics, Jul. 15, 2003, vol. 94, No. 2, pp. 904-911.
Gibson et al., "Metal Foams: A Design Guide", Chapter 9: The design of sandwich panels with foam cores, 1997, pp. 345-365, Month of Publication Unknown.
Jehring et al., "High-Strength Steel Hollow Spheres", Porous Metals and Metallic Foams, 2008, pp. 165-168, Month of Publication Unknown.
Johnson et al., "The use of metallic glasses in fabrication of ICF targets", J. Vac. Sci, Technol. A, Jul.-Sep. 1983, 1(3), pp. 1568-1570.
Kendall, "Experiments on annular liquid jet instability and on the formation of liquid shells", Phys. fluids, Jul. 1986, 29(7), pp. 2086-2094.
Kendall, "Hydrodynamic Performance of an Annular Liquid Jet: Production of Spherical Shells", Source and date unknown, 9 pgs.
Kendall et al., "Metal shell technology based upon hollow jet instability", J. Vac. Sci. Technol., Apr. 1982, vol. 20, No. 4, pp., 1091-1093.
Lee et al., "Sensational spherical shells", Aerospace America, Jan. 1986, pp. 1-4.
Lee et al., "Spheres of the metallic glass Au55 Pb22.5 Sb225 and their surface characteristics", Appl, Phys. Lett, Mar. 1, 1982, 40(5), pp. 382-384.
Lefebvre et al., "Porous Metals and Metallic Foams: Current Status and Recent Developments", Advanced Engineering Materials, 2008, vol. 10, No. 9, pp. 775-787, Month of Publication Unknown.
Rabiei et al., "A comparison of composite metal foam's properties and other comparable metal foams", Materials Letters, 2009, vol. 63, pp. 533-536, Month of Publication Unknown.
Reutter et al., "Characterization of Heat and Momentum Transfer in Sintered Metal Foams", Advanced Engineering materials, 2008, vol. 10, No. 9, pp. 812-815, Month of Publication Unknown.
Sanders et al., "Mechanics of BCC and FCC hollow-sphere foams", Materials Science and Engineering, 2003, vol. A352, pp. 150-161, Month of Publication Unknown.
Sanders et al., "Mechanics of hollow sphere foams", Materials Science and Engineering, 2003, vol. A347, pp. 70-85, Month of Publication Unknown.
Singh et al., "Hierarchically structured titanium foams for tissue scaffold applications", Acta Biomaterialia, 2010, vol. 6, pp. 4596-4604, Month of Publication Unknown.
Xue et al., "Ti Matrix Synatactic Foam Fabricated by Powder Metallurgy: Particle, Breakage and Elastic Modulus", JOM, Feb. 2011, vol. 63, No. 2, pp. 43-47.
Zhao et al., "Reliability of compressive fracture strength of Mg-Zn-Ca bulk metallic glasses: flaw sensitivity and Weibull statistics", Scripta Materialia, 2008, vol. 58, pp., Month of Publication Unknown.

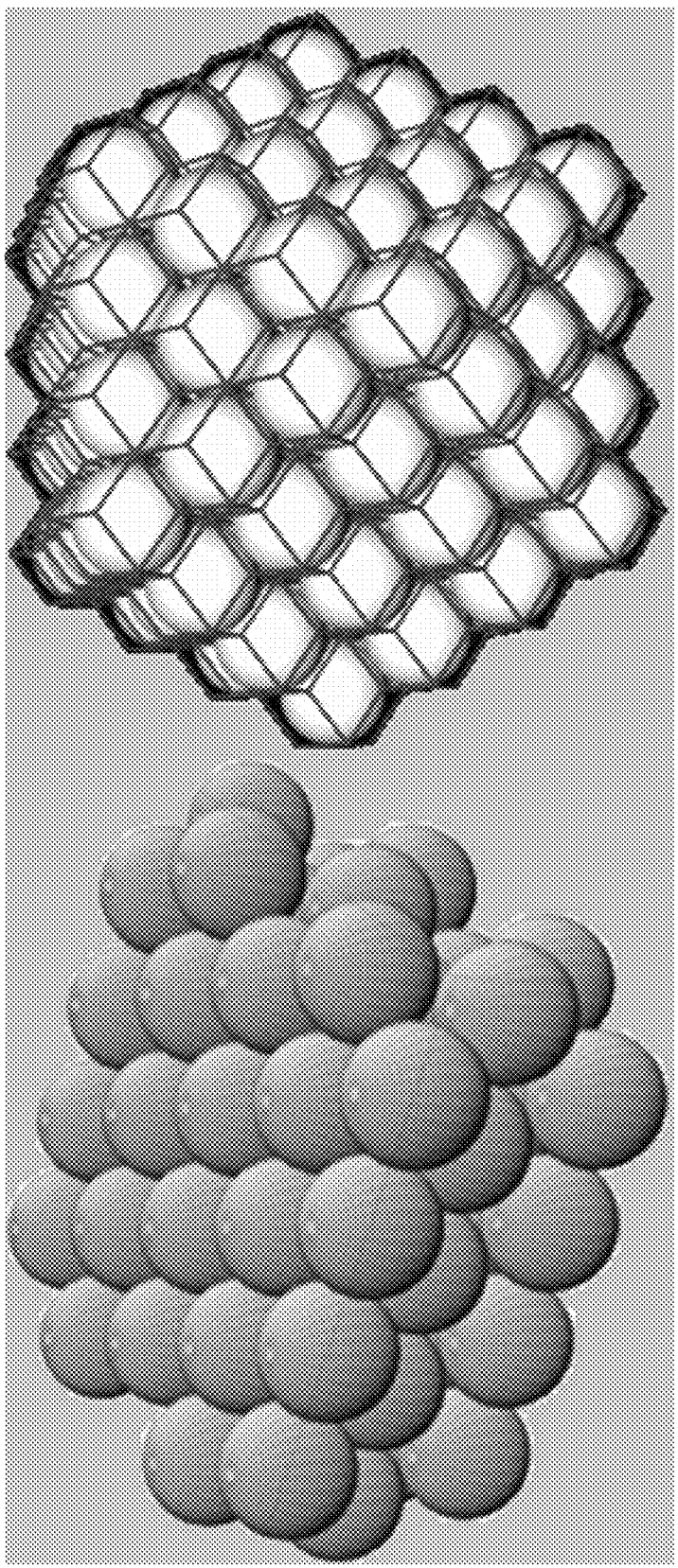

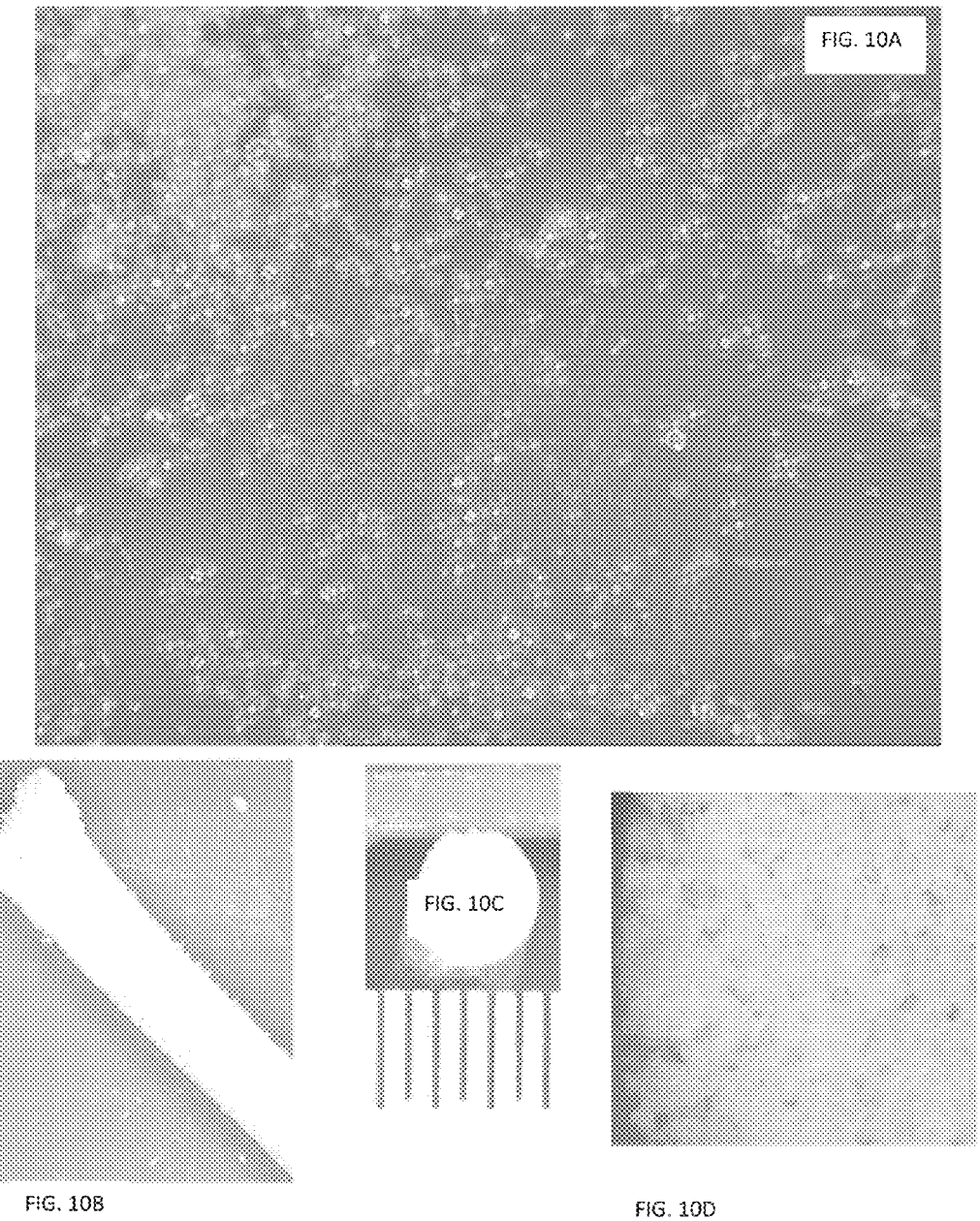

FOAMS MADE OF AMORPHOUS HOLLOW SPHERES AND METHODS OF MANUFACTURE THEREOF

CROSS-REFERENCE TO RELATED APPLICATIONS

The present application is a divisional application of and claims priority to U.S. patent application Ser. No. 13/428,740, filed Mar. 23, 2012, now U.S. Pat. No. 9,102,087, entitled "FOAMS MADE OF AMORPHOUS HOLLOW SPHERES AND METHODS OF MANUFACTURE THEREOF," which claims priority to U.S. Provisional Patent Application No. 61/466,784, filed Mar. 23, 2011, entitled "FOAMING AMORPHOUS HOLLOW SPHERES," the disclosures of which are expressly incorporated herein by reference. The present application is also related to U.S. patent application Ser. No. 14/790,334, filed Jul. 2, 2015, entitled "FOAMS MADE OF AMORPHOUS HOLLOW SPHERES AND METHODS OF MANUFACTURE THEREOF," the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,253) is assigned to the United States Government and is available for licensing for commercial purposes. Licensing and technical inquiries may be directed to the Technology Transfer Office, Naval Surface Warfare Center Corona.

FIELD OF THE INVENTION

This invention relates generally to novel foams formed of strong amorphous materials, and their method of manufacture; and more particularly to a foam formed of a plurality of hollow spheres.

BACKGROUND OF THE INVENTION

Foams and cellular solids are currently used in a wide variety of commercial and military applications, including armor, structural load bearing members, aircraft, cars, thermal and noise insulation, heat transfer, and catalysis. As such, the current state of the art in cellular solids is a very broad topic. Research areas include decreasing costs, increasing strengths, stiffnesses, energy absorption, heat exchange, catalytic capacity, biocompatibility, exploring foaming methods for new materials, hollow sphere structures, and high temperature suitable foams. (See, e.g., L P Lefebvre, J Banhart, D C Dunand, Adv. Eng. Mat. 10 (2008) 775; Y Boonyongmaneerat, C A Schuh, D C Dunand, Scripta Mater. 59 (2008) 336; X Xue, Y Zhao, JOM 63 (2011) 43; A Rabiei, L J Vendra, Mater. Lett. 63 (2009) 533; O Reutter, J Sauerhering, T Fend, R Pitz-Paal, S Angel, Adv. Eng. Mat. 10 (2008) 812; R Singh, P D Lee, J R Jones, G Poologasundarampillai, T Post, T C Lindley, R J Dashwood, Acta Biomater. 6 (2010) 4596; AH Brothers, D C Dunand, MRS Bull. 32 (2007) 639; U Jehring, P Quadbeck, H D Böhm, G Stephani, in Porous Metals and Metallic Foams, DEStech Publications Inc., Lancaster, Pa., 2008, pp. 165-168; and Y Boonyongmaneerat, D C Dunand, Adv. Eng. Mat. 10 (2008) 379; and G Walther, B Klöden, T Weissgärber, B Kieback, A Böhm, D Naumann, S Saberi, L Timberg in Porous Metals and Metallic Foams, DEStech Publications Inc., Lancaster, Pa., 2008, pp. 125-128, the disclosures of each of which are incorporated herein by reference.) Aluminum foams dominate the metallic foam literature and fabrication methods include the use of $TiH_2$ and $CaCO_3$ blowing agents and modifications to existing methods to achieve better properties. (See, L P Lefebvre, (2007), cited above.)

In addition to these standard materials, some research has been done on bonded hollow sphere structures. In conventional techniques, hollow spheres are made by coating sacrificial spheres with crystalline metals and thermally or chemically removing the sacrificial material or atomizing metallic melts. Hollow crystalline metal spheres can then be sintered together or "glued" with a binder material. (See, e.g., W S Sanders, L J Gibson, Mat. Sci. Eng. A 347 (2003) 70, the disclosure of which is incorporated herein by reference.) High strength cellular structures have been achieved with steel alloys (U. Jehring, (2008) cited above) and other crystalline metals (L P Lefebvre, (2007) cited above), but these individual methods are difficult to engineer, and may only be used with a limited number of materials.

As would be understood, regardless of the specific type of foam chosen, the properties required of that foam depend on the particular application. For example, foams used for armor and energy absorbing structures should be as light as possible while absorbing the maximum energy at a given plateau stress. (See, e.g., M F Ashby, Phil. Trans. R. Soc. A 364 (2006) 15, the disclosure of which is incorporated herein by reference.) In turn, foams used in load bearing applications should be designed for minimum weight at a given load. (See, M F Ashby, L U Tianjian, Science in China Series B 46 (2003) 521, the disclosure of which is incorporated herein by reference.) Likewise, sandwich panels and foam core structures (used in aircraft and race cars for example) require maximum stiffness, while minimizing weight. (See, L J Gibson, M F Ashby, Cellular Solids Structure and Properties, Cambridge University Press, New York, N. Y., 1997, pp. 55-61, 345-385, the disclosure of which is incorporated herein by reference.) Meanwhile, closed cell foams can be used for thermal, vibration, and noise insulation. Open cell foams, on the other hand, allow exposure to a large surface area to fluids flowing through them, which can be used for heat transfer and catalysis. (See, M F Ashby, A G Evans, N A Fleck, L J Gibson, J W Hutchinson, H N G Wadley, Metal Foams: A Design Guide, Butterworth-Heinemann, Woburn, Mass., 2000, pp. 113-188; and L P Lefebvre, J Banhart, D C Dunand, Adv. Eng. Mat. 10 (2008) 775, the disclosures of which are incorporated herein by reference.)

The general examples above currently require the selection of appropriate materials for each application, in a time consuming manner. First, the requirements for the application are quantified. Then, a "property profile" is developed which details the characteristics a material would need to meet the requirements. This selection process relies on compendiums of materials to see if a known material matches the property profile. If no material exists, new alloys must be invented or research and development must be performed to address the problem.

Within the amorphous metallic field, many patents on methods for foaming amorphous metallic glasses have been granted. U.S. Pat. No. 5,384,203 discusses a method similar to those found in U.S. Pat. Nos. 4,099,961 and 5,281,251, wherein a blowing agent is injected into the molten mixture and the material is foamed above the solidus temperature. Likewise, U.S. Pat. Nos. 7,073,560 and 7,621,314 both teach methods to introduce blowing agents into the metallic glass forming alloy in the molten state and then expand the bubbles upon cooling from the melt but above $T_g$ or by cooling to a solid, reheating the alloy above $T_g$ and expanding the bubbles at that time. Meanwhile, U.S. Pat. No. 7,597,840 teaches a method of making a foam precursor by consolidating amorphous powders around finely dispersed particles of blowing agent and foaming that mixture above $T_g$.

However, despite the extensive research, the scientific literature reveals limited success in making high porosity foams from metallic glasses. (See, Brothers, Dunand. Scripta Mater. 54 p 513, 2006, the disclosure of which is incorporated herein by reference.) Expensive Pd and Pt glass forming alloys are one example of high porosity foams. Boron Oxide Hydrate is dissolved in the amorphous melt to form a "pre-foam" and the mixture is expanded at $T>T_g$ to form high strength, highly porous structures. (See, Demetriou, Hanan, Veazey, Di Michiel, Lenoir, Ustundag, Johnson. Adv. Mater. 19 p 1957, 2007; and Wang, Demetriou, Schramm, Liaw, Johnson. J. Appl. Phys. 108 p 023505, 2010, the disclosures of which are incorporated herein by reference.) Fe based metallic glasses and Zr based metallic glasses have also been foamed using different methods, but porosity is usually lower than that obtainable for Pd based bulk metallic glass (BMG) forming alloys. (See, Demetriou, Duan, Veazey, De Blauwe, Johnson. Scripta Mater. 57 p 9, 2007; and Brothers, Scheunemann, DeFouw, Dunand. Scripta Mater. 52 p 335, 2005, the disclosures of which are incorporated herein by reference.) Nowhere is there provided a method that allows for the formation of foams from a wide-variety of amorphous materials in a manner that also provides a way to uniquely tailor the cell size, wall thickness, internal cell pressure, and material strength.

Accordingly, a need exists to find a novel approach that could produce foams and cellular materials with a range of densities, strengths, and stiffnesses to meet these varied applications and needs.

BRIEF SUMMARY OF THE INVENTION

The current invention is directed generally to foams formed from amorphous hollow spheres formed from high strength amorphous materials, and methods of their manufacture.

In some embodiments, the invention is directed to a method of forming a cellular solid from an amorphous material including:
- obtaining an amorphous material having a glass transition;
- forming at least one hollow sphere from the amorphous material, the hollow sphere having an internal pressure;
- confining the at least one hollow sphere within a body;
- heating the at least one hollow sphere to a temperature above the glass transition temperature of the amorphous material;
- applying a pressure differential between the internal pressure of the at least one hollow sphere and the pressure of the atmosphere within the confining body, such that the at least one hollow sphere one of either expands or contracts within the boundary defined by the body to form a unitary cellular solid.

In one such embodiment, the method includes a plurality of hollow spheres that expand or contract until they come into contact with any adjacent hollow spheres.

In another such embodiment, the plurality of hollow spheres bond together upon making contact.

In still another such embodiment, the outer surfaces of the plurality of hollows spheres undergo a surface treatment that enhances the bonding of spheres at contact points. Such treatments may include but are not limited to cleaning, etching, exposure to a plasma, and processing in inert atmosphere.

In yet another such embodiment, the plurality of hollow spheres remain unbonded upon making contact.

In still yet another such embodiment, the plurality of hollow spheres undergo a surface treatment to minimize the bonding of spheres at contact points. Such treatments may include but are not limited to applications of coatings such as oils, growth of oxides, and exposing the plurality of spheres to reactive chemicals.

In still yet another such embodiment, the pressure of the atmosphere within the at least one hollow sphere and the confining body are equal to each other and greater than atmospheric pressure, and the pressure differential is generated by depressurizing the atmosphere within the confining body thereby causing the at least one hollow sphere to expand.

In still yet another such embodiment, the pressure of the atmosphere within the confining body is greater than the pressure within the at least one hollow sphere, and wherein the pressure of both are greater than atmospheric pressure, and the pressure differential is generated by depressurizing the atmosphere within the confining body thereby causing the at least one hollow sphere to expand.

In still yet another such embodiment, the pressure of the atmosphere within the at least one hollow sphere and the confining body are both equal to or less than atmospheric pressure, and the pressure differential is generated by exposing the atmosphere within the confining body to a lower pressure thereby causing the at least one hollow sphere to expand.

In still yet another such embodiment, the pressure of the atmosphere within the at least one hollow sphere is less than the pressure of the atmosphere within the confining body such that when the at least one hollow sphere is heated above the glass transition temperature the at least one hollow sphere compresses as the pressure within the at least one hollow sphere and the atmosphere within the confining body move toward equilibrium.

In still yet another such embodiment, the pressure of the atmosphere within the at least one hollow sphere is greater than the pressure of the atmosphere within the confining body such that when the at least one hollow sphere is heated above the glass transition temperature the at least one hollow sphere expands as the pressure within the at least one hollow sphere and the atmosphere within the confining body move toward equilibrium.

In still yet another such embodiment, there are a plurality of hollow spheres, and wherein at least two of the spheres have different internal pressures.

In still yet another such embodiment, there are a plurality of hollow spheres, wherein the spheres are formed in at least two sizes.

In still yet another such embodiment, there are a plurality of hollow spheres, wherein the spheres have at least two wall thicknesses.

In still yet another such embodiment, the at least one hollow sphere is formed from a material selected from the group consisting of glass compositions, silicate glasses, metallic glasses, ceramic glasses, and composite materials with an amorphous phase and amorphous or crystalline inclusions.

In still yet another such embodiment, a non-amorphous material is included in one of either the inside volume of the at least one hollow sphere or within the confining body.

In still yet another such embodiment, the at least one hollow sphere is expanded until the sphere ruptures to form an open celled cellular solid.

In still yet another such embodiment, an open cell cellular solid is formed by minimizing the pressure differential between the internal pressure of the at least one hollow sphere and the pressure of the atmosphere within the confining body such that the hollow spheres are allowed to bond at points of contact.

In still yet another such embodiment, the confining body defines a volume that can one of either expand or compress during the expansion of the at least one hollow sphere.

In still yet another such embodiment, the internal volume of the at least one hollow spheres is filled with a material reactive to the amorphous material.

In still yet another such embodiment, the at least one hollow sphere is formed in an inert atmosphere.

In still yet another such embodiment, at least one hollow sphere has one of either a positive or negative charge thereon.

In still yet another such embodiment, there are a plurality of charged hollow spheres, and wherein the spheres are sorted and arranged by means of their charge within the confining body prior to expansion.

In still yet another such embodiment, further including inserting a ductile inclusion within the inner volume of the at least one hollow sphere.

In still yet another such embodiment, the at least one hollow sphere is submerged in a pressurized fluid and the at least one hollow sphere compressed until the pressure inside the at least one hollow sphere equals the pressure of the fluid to form at least one hollow sphere with an internal pressure greater than the initial pressure.

In still yet another such embodiment, there are a plurality of hollow spheres wherein at least two of the hollow spheres are filled with different gasses.

In still yet another such embodiment, the gas includes one of either a liquid or solid blowing agent.

In still yet another such embodiment, there are a plurality of hollow spheres, and wherein at least two of the hollow spheres are formed of different amorphous materials.

In other embodiments, the invention is directed to a method of forming a cellular solid from an amorphous material including:
  obtaining an amorphous material having a glass transition;
  forming a plurality of hollow spheres from the amorphous material, the hollow spheres each having an internal pressure;
  confining the plurality of hollow spheres within a body;
  heating the plurality of hollow spheres to a temperature above the glass transition temperature of the amorphous material; and
  applying a pressure differential between the internal pressure of the plurality of hollow spheres and the pressure of the atmosphere within the confining body, such that the hollow spheres one of either expand or contract within the boundary defined by the body until they make contact with at least one adjacent hollow sphere to form a cellular structure.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein:

FIGS. 2A and 2B provide schematics of foams expected from embodiments of the inventive method, including: (A) an open cell foam made of hollow spheres bonded together by pressurizing mold above internal pressure of spheres and heating to $T_g$ where spheres soften and bond together at contact points, and (B) a closed cell foam made of hollow spheres expanded by heating material to $T_g$ and lowering pressure inside mold below pressure inside spheres so spheres expand and bond along faces.

FIGS. 10A to 10D provide images of cellular foam in accordance with embodiments of the current invention, where: (A) is a picture of the spheres prior to expansion, (B) is a side view of the cylindrical foam, (C) is a top view of a section of the foam, and (D) is a close up view of (C).

DEFINITIONS OF TERMS

For the purposes of the invention, the terms listed below shall be considered to have the following meanings.

Hollow sphere shall mean something that is not necessarily perfectly spherical, and shall include ellipsoids and other hollow geometries.

The terms BB, microsphere and microballoon shall mean a hollow sphere, without restriction on sphere diameter or wall thickness.

$T_g$ shall reference the glass transition temperature of the material.

$P_{int}$ shall reference the pressure inside a hollow sphere.

$P_{ext}$ shall reference the pressure of fluid (gas or liquid) that the sphere resides in (e.g., may be the fluid pressure enclosed within a container in which the hollow sphere has been placed).

Surface tension shall reference the surface tension at equilibrium, a droplet with one surface will have a surface tension T given by the equation:

$$P_{int} - P_{ext} = 2T/r \qquad (EQ.\ 1)$$

where r is the radius of the droplet. The pressure differentials required to expand or collapse hollow spheres do not explicitly include surface tension. Given that surface tension is a function of temperature for glasses above $T_g$, experimental determination of T(T) would be required to determine the exact pressures for pressure equilibrium as a function of temperature.

Container shall mean any shape that prevents infinite expansion of hollow spheres, e.g., ship hull, airplane wing, a cylinder, a complex shape with internal structure that the foam will fill around.

Foaming shall mean the expansion or contraction of hollow spheres at $T>T_g$ due to a pressure differential. For containers filled with hollow spheres, especially multiple sizes, high packing efficiency could result and foaming such a structure may involve minimal expansion of spheres (assuming $P_{int}>P_{ext}$). Containers partially filled with hollow spheres would likely result in greater expansion of hollow spheres when $T>T_g$ (assuming $P_{int}>P_{ext}$).

Amorphous materials mean a material with a glass transition having bulk (non-porous) material yield strength preferably greater than 500 MPa, more preferably greater than 1000 MPa, and most preferably greater than 2000 MPa.

DETAILED DESCRIPTION OF THE INVENTION

The current invention is directed to novel cellular solids and foams from amorphous materials with a glass transition temperature ($T_g$) and methods of forming such materials. In particular, the current invention is directed to foams formed by expanding or compressing hollow spheres (made of a high strength amorphous material, which is defined as a material having high strength characteristics, but also possessing a glass transition) within a confined space. Using such a method, it has been unexpectedly found that it is possible to make cellular structures, including both open and closed cell foams, with customizable properties from materials that have been inaccessible with conventional methods. Moreover, based on calculations high specific strengths and stiffnesses are expected.

Figure 1:
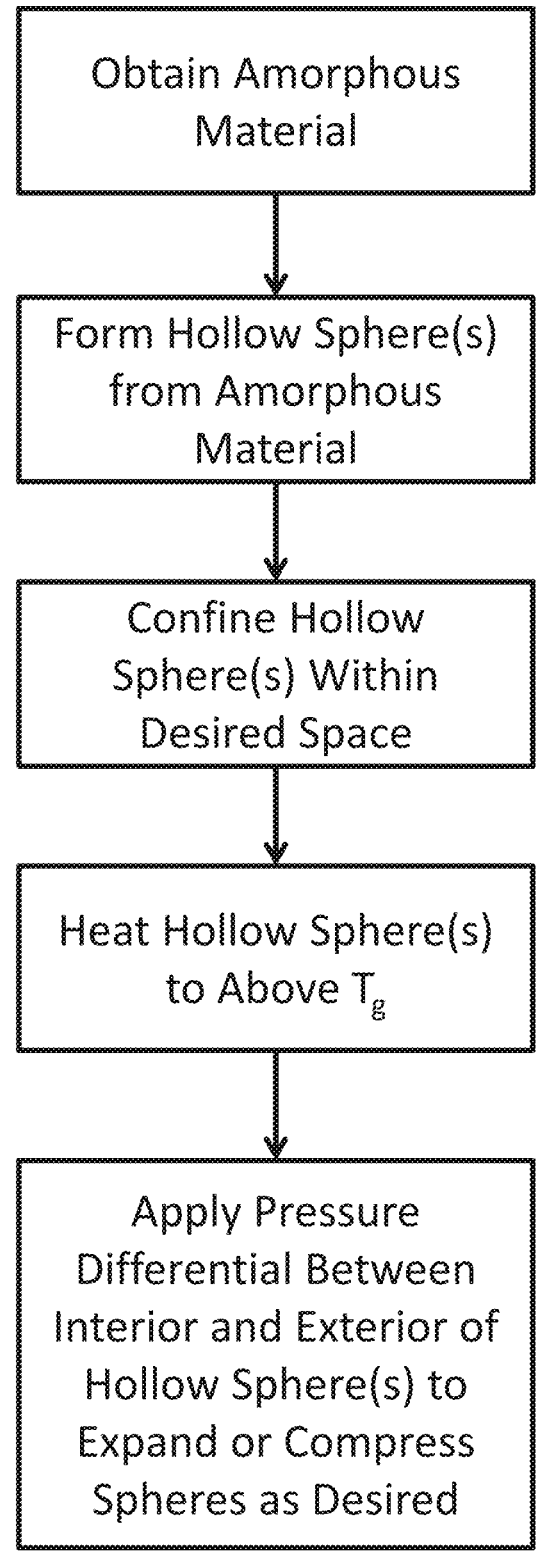
FIG. 1, provides a flow chart of an exemplary hollow sphere foaming method in accordance with embodiments of the current invention.

Embodiments of methods of forming such hollow sphere cellular materials and foams may follow, for example, the flow chart provided in FIG. 1, which sets out the basic steps of the process, including:
  Selecting a high strength amorphous material;
  Forming gas-filled hollow spheres from the amorphous material;
  Enclosing a plurality of the spheres within an enclosed space; and
  Either compressing or expanding the spheres to fill the space, thereby creating the cellular solid or foam desired.

Computer generated images of open cell and closed cell foam geometries expected from foam embodiments formed from his fabrication method are shown in FIG. 2. It should be understood that these images and the final geometries are merely exemplary. Different final configurations and shapes can be obtained by modifying the initial pre-expansion packing geometries. For example, in the example in FIG. 2 cubic close packed spheres have been expanded forming cells that are rhombic dodecahedrons.

First, with respect to the selection of the material, it should be understood that many materials can exist as amorphous solids and transition from solid-like to liquid-like behavior at a glass transition temperature, $T_g$, and that so long as these materials have sufficient strength for engineering applications they are contemplated by the current invention. For the purposes of the instant invention, an "amorphous" material is defined as a substance that behaves like a solid at temperatures where $T<T_g$, but softens at temperatures where $T>T_g$. (See, e.g., Busch, Bakke, Johnson. Acta Mater. 46 (13), p 4725, 1998, the disclosure of which is incorporated herein by reference.) Some well-known materials with a $T_g$ are listed below, however the inventive process described herein will work with any material exhibiting a $T_g$ and example materials listed in this paragraph are given for illustrative purposes only and are not to be considered all inclusive. Materials with $T_g$:
  $SiO_2$ and other glass compositions including borosilicate, soda-lime, and metal oxide;
  Metallic glasses including Zr based glasses such as Vitreloy as well as many other alloy families;
  Ceramic glasses such as boron oxide, $B_2O_3$; and
  Composite materials with an amorphous phase and amorphous or crystalline inclusions.

It will be noted that this method excludes the possibility of using plastics or other polymeric materials. The reason for this exclusion is two-fold, plastics have poor strength and stiffness characteristics making them unsuitable for the types of applications contemplated by the instant invention; and plastics have unique properties that may or may not be analogous to the techniques contemplated herein. Accordingly, for the purposes of this application the term amorphous material is defined as materials having bulk (non-porous) material yield strength preferably greater than 500 MPa, more preferably greater than 1000 MPa, and most preferably greater than 2000 MPa.

Turning to the method of manufacturing the amorphous hollow spheres. It will be understood that amorphous materials can be made into hollow spheres using many different manufacturing routes. For example, an early method for producing hollow spheres from film forming materials was taught by Kendall et al., which describes a strong instability in the fluid dynamics of annular jets. (See, e.g., J M Kendall, M C Lee, T G Wang, J. Vac. Sci. Technol. 20 (1982) 1091; M C Lee, J M Kendall, Appl. Phys. Lett. 40 (1982) 382; and J M Kendall, Proceedings of the Second International Colloquium on Drops and Bubbles (1981) 79, the disclosures of which are incorporated herein by reference.) In particular, the authors describe when a gas is flowed coaxially within an annular cylinder of molten material, the material will spontaneously pinch off into gas filled hollow spheres at 100-1000 Hz. (See, e.g., M C Lee, J M Kendall, P A Bahrami, T G Wang, Aerospace America 24 (1986) 72, the disclosure of which is incorporated herein by reference.)

Further descriptions of suitable techniques are provided in U.S. Pat. No. 2,797,201 (which describe producing hollow spheres from polymer based materials); U.S. Pat. Nos. 3,615,972 and 3,740,359 which describe polymer or plastic microsphere forming methods); U.S. Pat. No. 2,978,339 (which describes a method to produce pressurized hollow glass spheres); and U.S. Pat. No. 4,568,389 (which describes a method for producing hollow metal spheres). The disclosures of all of the references listed in this section are incorporated herein by reference. It should be understood that the hollow spheres formed in accordance with these methods may have an internal pressure above or below ambient pressure. While, these hollow spheres are often referred to as "BBs", "microballoons" or "microspheres", no restriction on the size of these hollow spheres is given for the purposes of this invention.

Figure 3A:
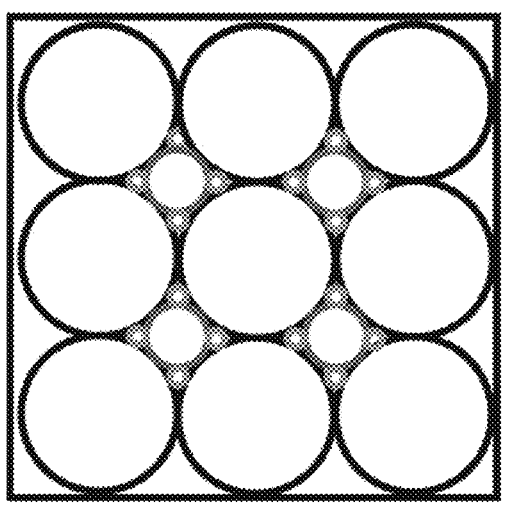
FIGS. 3A and 3B provide schematics of fractal foams in accordance with the current invention, where: (A) shows a foam formed from three sizes of spheres packed in a square box to make "fractal foam", and (B) shows the geometry after the spheres are expanded above $T_g$.
Figure 3B:
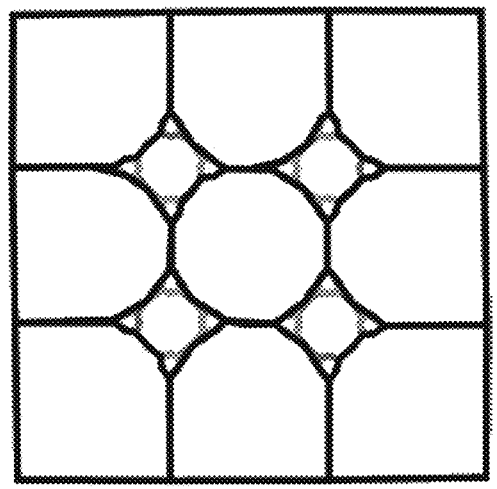
Figure 4A:
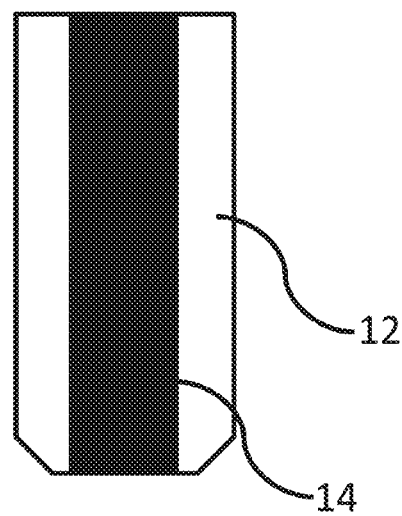
FIGS. 4A to 4D provide schematics of techniques of (A-C) injecting a crystalline ductile phase (shown as a dark circle) within the amorphous hollow spheres in accordance with embodiments of the current invention, and (D) forming a armor material out of such a composite material.
Figure 4B:
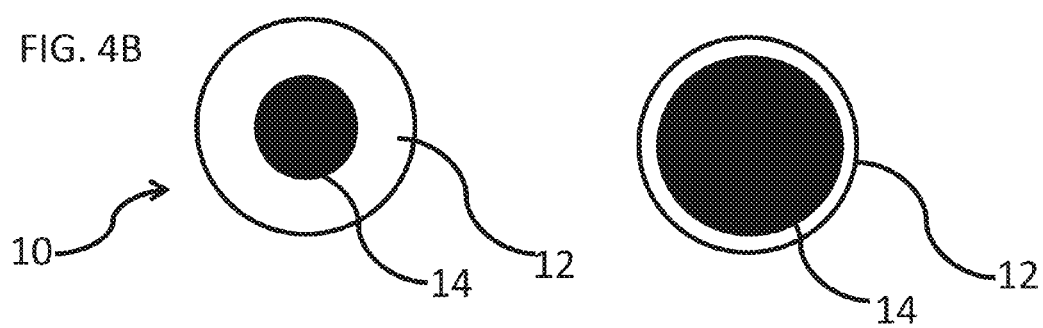
Figure 4C:
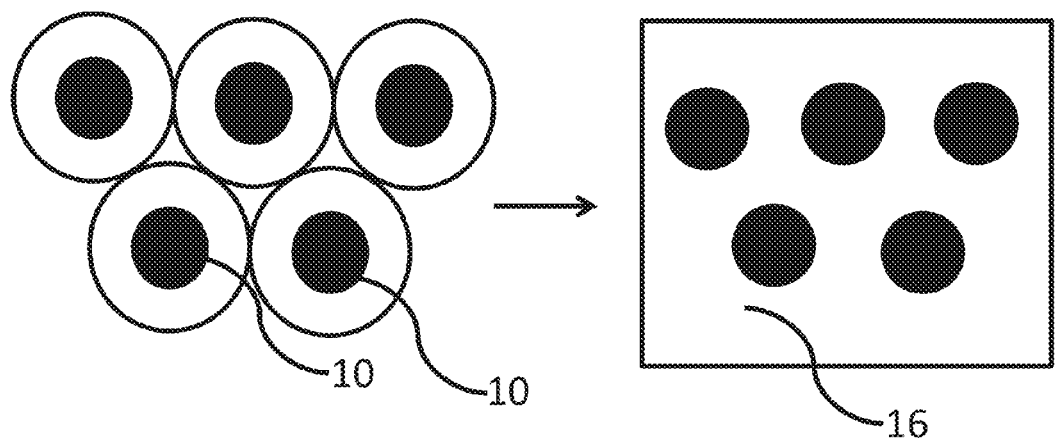
Figure 4D:
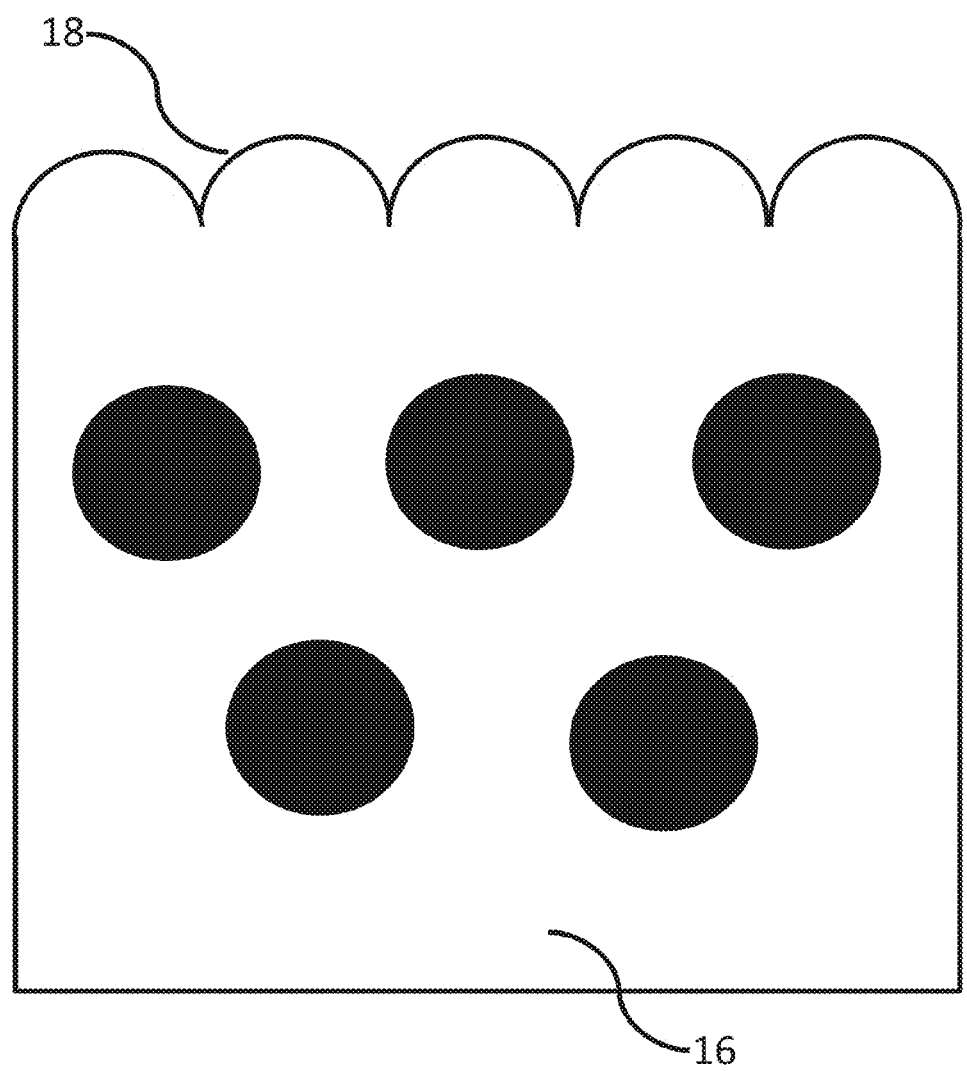
Figure 5:
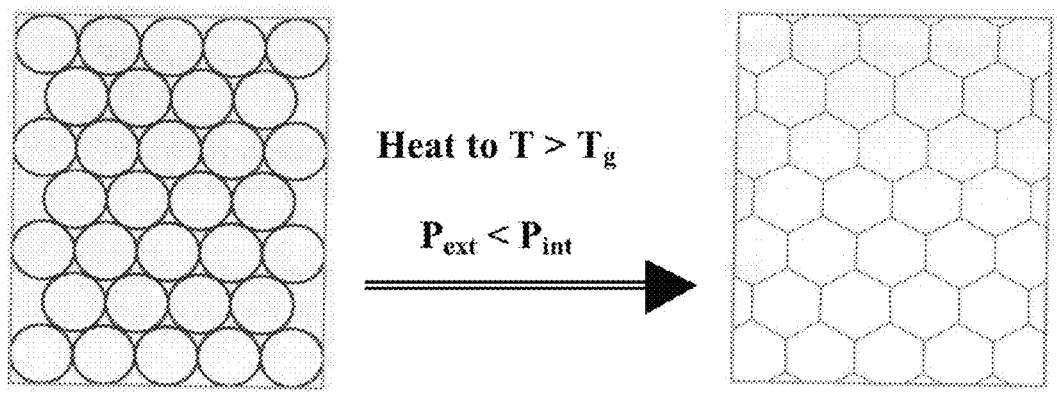
FIG. 5, provides a schematic of a hollow sphere foaming process in accordance with embodiments of the current invention.

Although the above has described the basic methods of manufacturing the hollow spheres, it should be understood that in some embodiments the technique may be modified to provide hollow spheres having very specifically engineered properties. Some exemplary modifications include:

- A getter may be included (e.g., a hot Ti wire) in an inert atmosphere where the spheres are formed to minimize the oxidation of the hollow spheres. This is particularly advantageous where metallic glass alloy spheres are formed as oxidation can degrade their properties.
- Using a method as described above, but with a gas that is reactive with the material of which the hollow sphere is made so residual gas will react and be sequestered, leaving the interior of the sphere at vacuum pressures. Such a technique would be particularly useful for insulation purposes.
- Another strategy to prevent oxides or residues from forming or collecting on the hollow spheres is to form them in an inert atmosphere and design handling processes and equipment to avoid exposure to contaminating or reactive atmospheres. One exemplary technique would be to use a method similar to the one described above where the falling hollow spheres are contained in a drop tower filled with inert gas, which could terminate in a glove box to facilitate removal of hollow spheres from the drop tower.
- In another embodiment, the hollow metal spheres are either positively or negatively charged and a charged surface is used to apply a force on them. Application of either a magnetic field or an electric field on the charged hollow spheres while in motion would then act like a mass spectrometer and could allow the hollow spheres to be sorted and packed in specific configurations.
- Using charged spheres it would also be possible to use varying electric and magnetic fields to selectively stack the hollow spheres in an ideal packing structure to obtain a "fractal foam" with multiple sized spheres or in a specific packing structure for identically sized spheres. (Schematics of such "fractal" foams can be seen in FIG. 3.) Although one embodiment is shown in the figures, it should be understood that alternative sphere size distributions could include ideal aggregate distributions for dense packing of aggregate as in concrete mixtures.
- In another alternative for amorphous alloy spheres, ductile inclusions could be incorporated into the hollow spheres during manufacture. In such an embodiment, as shown schematically in FIG. 4a, the droplet (10) of amorphous alloy material would include an inner stream of a molten alloy that will form a crystalline inclusion (14) with a lower shear modulus than the amorphous alloy (12) thus allowing for ductile failure as described in Hofmann, D. C., et al. Nature, 451: 1085-1089, (2008), the disclosure of which is incorporated herein by reference. The inclusion thus formed may fill either the entire inner volume of the hollow sphere or only a portion thereof (as shown in FIG. 4b). Moreover, it is possible to use a foam (16) of such spheres (FIG. 4c) to create special composite armor structures (18), such as, for example, by forming the foam with bullet tripping geometries to defeat armor piercing bullets above $T_g$ (as shown schematically in FIG. 4d).
- Finally, in another embodiment, hollow sphere pressurization can be done hydrostatically after formation. In such an embodiment, the sphere would be submerged in a fluid, and the fluid pressurized above the internal pressure of the hollow sphere. The liquid and submerged sphere would then be heated to $T_g$ and the sphere shrunk until $P_{int}=P_{ext}$. The material could then be cooled back to glass at high pressure, or can be further pressurized at $T_g$ to any desired internal pressure. The advantage of such a technique is that high-pressure hollow spheres can be formed without the danger of explosive failure that can occur in the case of hollow spheres pressurized in a gaseous environment.
- The gas entrapped within the hollow sphere could be made to vary depending on the desired properties of the spheres.
- A liquid or solid blowing agent could be inserted coaxially with or without the inner fill gas like liquid nitrogen or dry ice, or liquid/solid Deuterium-Tritium to attain higher hollow sphere interior pressures and aid in cooling.
- The hollow sphere could be made in a pressurized and possibly heated drop tower to allow spheres to be formed with higher internal pressures Regardless of the ultimate design and manufacture of the hollow spheres, as long as they are made from an appropriate amorphous material (i.e., a high strength material with a glass transition temperature) and placed in a confined space prior to expansion, the method of the invention can be used to form hollow spheres into a foam cellular structure. For example, in some embodiments, one or a plurality of hollow spheres are placed in a confined region and heated to $T_g$ (where the material softens and begins to flow), and then compressed or expanded and bonded together by altering the pressure conditions between the chamber or mold in which the spheres are confined and the spheres themselves. A schematic of this process is provided in FIG. 5. Although this is the simplest description of the invention possible, it will be understood that there are a number of embodiments that allow for the tailoring of this method to specific purposes.

In particular, it should be understood that as long as the amorphous hollow spheres are heated above their $T_g$ and that a pressure differential is applied between the external pressure and internal pressures of the hollow spheres then expansion or compression can be accomplished. However, the expansion or compression of the hollow spheres may take a number of different forms.

In one embodiment, hollow spheres (made of amorphous material) with $P_{int}$>atmospheric pressure are placed in a pressurized container ($P_{ext}$>$P_{int}$>atmospheric) and heated to $T$>$T_g$. In such an embodiment the pressurized container is depressurized and the hollow spheres expand, bond or fuse together.

In other embodiments, the hollow spheres (made of amorphous material) with $P_{int}$>atmospheric pressure are placed in a pressurized container ($P_{ext}$>$P_{int}$>atmospheric) and heated to $T$>$T_g$. The pressurized container is depressurized and the hollow spheres expand, touch each other, and bond or fuse together.

Alternatively, expansion can be obtained where the restriction $P_{int}$>atmospheric pressure is removed. In this embodiment, $P_{ext}$ is decreased below $P_{int}$, both of which are less than atmospheric pressure after the hollow spheres are heated to a temperature $T$>$T_g$.

In yet another alternative, the hollow spheres could be heated to $T$>$T_g$ in an environment where $P_{ext}$<$P_{int}$.

In still another alternative, the hollow spheres could be heated to $T$>$T_g$ in an environment where $P_{ext}$>$P_{int}$. This would cause compression of the hollow spheres until $P_{int}$=$P_{ext}$, or the temperature dropped below $T_g$.

It should be understood that the hollow spheres may be provided with different internal pressures from each other. The advantage of such a system is that it allows for differential expansion or compression of spheres based on their variable internal pressures. The internal pressures of the spheres can be measured mechanically if the size and wall thickness and alloy strength are known, otherwise it can be determined by lancing the sphere and using $P_1V_1$=$P_2V_2$ in gas filled container or increase water pressure method.

The above discussion assumes that the spheres are compressed together sufficiently to cause bonding of the spheres. It should be understood that in any of the above embodiments the spheres might be expanded and heated such that they either fuse together or do not fuse together. The determining factor is the amount of expansion and the extent to which the spheres are allowed to intermingle at the low viscosity regime above $T_g$. In this embodiment, the hollow spheres may not bond, nevertheless any rigidity imparted by filling a container with a pressurized material that expands to fill most of the space still provides strength and stiffness to the container greater than would be obtainable in an empty container. In order to maximize the likelihood of expanding hollow spheres not bonding together, surface treatments, such as oxides, oils, or other residues could be used to coat the hollow spheres prior to heating to $T$>$T_g$. By contrast, in order to minimize the likelihood of expanding hollow spheres not bonding together, etchants, fluxes, or other surface treatments could be affected to remove unwanted residues or coatings on the hollow spheres. In one example, spheres could be cleaned with a detergent and rinsed prior to heating and foaming. In another example, spheres may be cleaned by a plasma. In another example an etchant such as HF or HCl could be used to remove an oxide layer (especially for Zr or Ti based metallic glasses) and the etchant could be evaporated under vacuum at elevated temperatures.

Likewise, in any embodiment, it will be understood that there are a number of adjustable variables that can be used to engineer the properties of the final foam, such as, for example, the initial hollow sphere size, the hollow sphere wall thickness, the sphere material, and the material or lack thereof occupying the center of the hollow sphere. For example, in any embodiment, multiple different sized spheres may be packed in the container to create a "fractal foam" as described with respect to FIG. 3, above. Similarly, in any embodiment, the hollow spheres may have differing wall thicknesses to allow for variations in the material and physical properties of the foams. Finally, in any embodiment, the hollow spheres may be made of different amorphous materials. Moreover, by maintaining proper mass to volume ratios of the hollow spheres, control of "settling" can be achieved prior to the foaming process allowing for the controlled packing of the spheres within the confined spaced. In embodiments where variable wall-thicknesses are desired, the sphere wall thickness can be determined by alloy density and weight and diameter measurements.

The above discussion assumes that the only material confined within the mold or cellular structure are the amorphous hollow spheres, however, in some embodiments some fraction of the material in the container may be non-amorphous. By including other non-amorphous, and therefore non-expansive materials within the hollow spheres or simply within the confining space it is possible to create composite foams with crystalline, liquid, or gas regions held in place by expanded amorphous material and tunable mechanical properties.

The invention contemplates that some of the hollow spheres may rupture in the foaming process. This can create open cell foams and beneficial pathways of rupture could be designed into the foam if an application called for such. For example, open foams could be made by raising the temperature above the glass transition temperature and maintaining $P_{int}$=$P_{ext}$ without applying other compressive forces. Because the hollow spheres would be allowed time to intermingle at low viscosities in this scenario, the fusing of the hollow spheres to each other at every point of contact should be ensured.

The above discussion has focused almost entirely on the design and disposition of the hollow spheres and the external pressure and temperature applied to them during expansion of compression, however, it should be understood that the container in which the spheres are placed can also be engineered to yield novel foam and cellular structures. For example, the container could have movable parts and walls to dynamically compress or expand the shape during foaming. One possible beneficial outcome of releasing pressure of the container in various embodiments of this invention is the cooling effect of an expanding gas. This cooling may allow marginal glass formers to avoid crystallization by quickly cooling them below $T_g$ after foaming. The container may also have fixed or removable feed-throughs to make pathways in the foam if desired.

Figure 6:
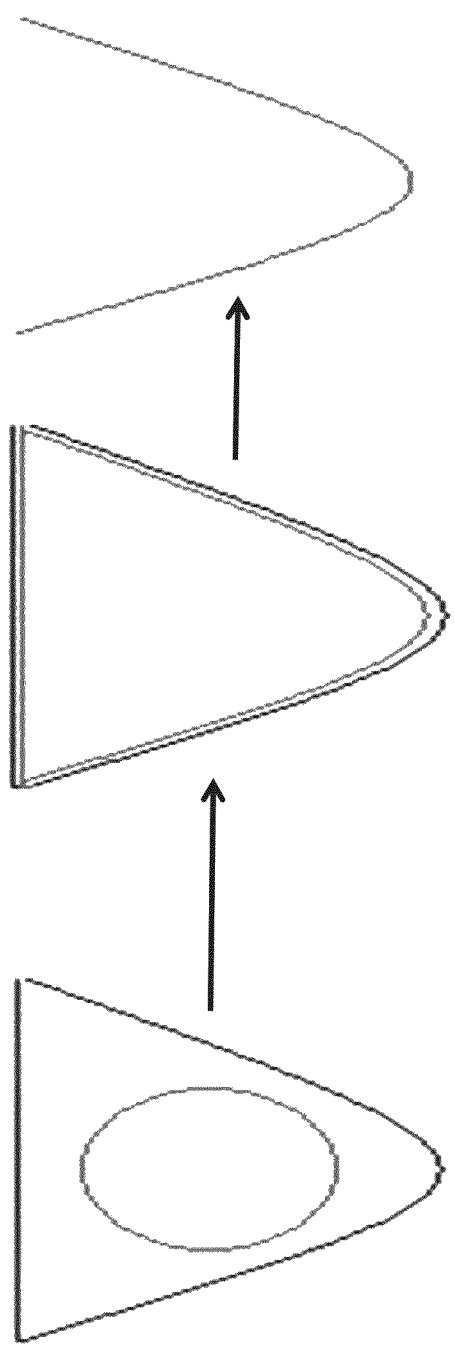
FIG. 6 shows a schematic of a method of forming a parabolic mirror form the expansion of a single hollow sphere in accordance with embodiments of the current invention.
Figure 7:
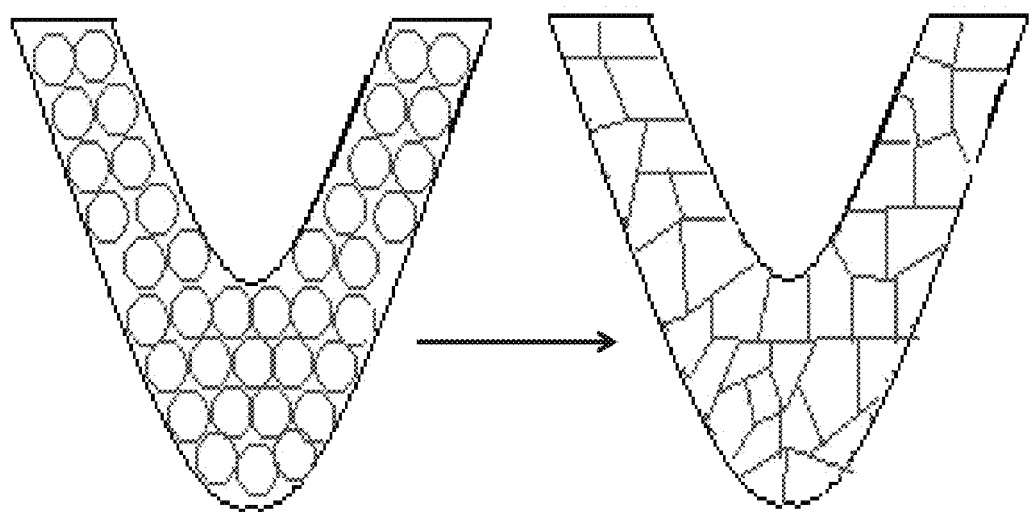
FIG. 7 shows a schematic of a method of forming a parabolic mirror form the expansion of a plurality of hollow spheres in accordance with embodiments of the current invention.

Although the above discussion has focused on the process of forming the foams and cellular solids in accordance with the current invention, it should be understood that the current invention is also directed to the novel foams themselves and their applications in a wide variety of applications. In particular, because the expansion of the amorphous hollow spheres can take place within any containment vessels of any geometry, the applications of the foams are unlimited. Moreover, once the expansion or compression has taken place, the container wall can be optionally removed thereby even further expanding the possible applications of the foams of the invention. Accordingly, some non-limiting examples of possible applications include:

Structural materials and crumple zones for ocean vessel (Naval or commercial ships), automobile, aircraft, spacecraft, bicycle, etc.;

Filling the inside skin of particular geometries for use as structural members for load bearing equipment (e.g. rigid struts, beams, mechanical support equipment or aircraft wings);

Packaging materials or crates for the transport/handling of explosives, rocket motors, and electronic control sections;

Energy absorbing structures with possible applications for explosive/energetic weapons handling, or improvised explosive device (IED) protection;

Flotation;

Optical traps;

Parabolic mirrors (see FIG. 6 which shows a schematic where a single hollow sphere of metallic glass or other reflective amorphous solid is expanded inside a parabolic cavity and then the front cut-off to allow for reflection off of the interior or foamed sphere;

Parabolic mirrors (see FIG. 7 where the interior of a parabolic hollow shell is filled with reflective foamed amorphous spheres to form a reflective surface);

Other mirror geometries;

Reflectors (tetrahedron/simple cubic geometry/others as applicable);

Thermal/noise insulators (near vacuum in spheres, highly reflective surfaces);

Construction materials (e.g. metallic "wood", roofing material, insulation in walls);

EMP protection and faraday cage production;

X-ray reflection and possible protection for laboratories, medical facilities, scientists/technicians or medical patients;

Electrode construction for batteries and/or fuel cells (the internal gas could be made to be the fuel/oxidizer for fuel cells);

Using amorphous material with catalytic properties the foams could be made into catalytic devices (i.e., hollow spheres, made of metals such as platinum based glasses which have utility as catalysts, could be used as an open cell foam or have their densities chosen such that they float in a solution and provide a large surface area of reaction);

Arranging spheres with differing Seebeck coefficients within the foam could make thermo-electric devices;

Arranging spheres with differing electrical resistances could make 3 dimensional circuit boards and/or electrical devices (resistors, inductors, capacitors, transistors, switches, to name a few);

Arranging hollow spheres with differing burst characteristics (wall thickness or internal pressure) a "witness plate" can be fashioned for measuring high temperatures or high pressures (i.e., a device to provide a measurement of maximum temperatures or pressures);

Self-sharpening abrasives;

Higher density regions such as the edges of a plate or ends or side of a cylinder could be designed into a foam to allow for welding or other joining processes of foams to other foams, or foams to other materials;

Various geometries of foam could be brazed or soldered to each other or other materials with appropriate melting temperature materials;

Hollow spheres filled to high pressures could be used for fuel storage, for instance hydrogen and oxygen filled spheres could be used in combustion engines or fuel cells;

Unique geometries such as toroids could be linked;

Threads of amorphous spheres could be woven;

Heat exchanger materials wherein heat from gas, compressed in spheres deformed by compression, could be removed by a fluid, or heat could be dissipated from a fluid by gas in spheres cooled by expanding or removing a force;

Mechanical energy storage such as springs including compressive and extensive and helical or torsional or other geometries;

Use of hollow spheres with different coefficients of thermal expansion arranged to create structures highly tolerant of temperature fluctuations (useful in gage blocks) (requires special mold);

Variables of wall thickness, internal gas pressure, BB diameter, composition/yield strength allow different strengths and crumple zones and directed energy dispersion or failure engineering;

Voids may be created by having BBs with higher $T_g$ or non-amorphous material encased in foamed material that are poured out after foaming;

Mold may include internal and external shapes that leave voids or are left behind which would allow gas/electricity/water paths to be molded in foam.

EXEMPLARY EMBODIMENTS

The person skilled in the art will recognize that additional embodiments according to the invention are contemplated as being within the scope of the foregoing generic disclosure, and no disclaimer is in any way intended by the foregoing, non-limiting examples.

Example 1

Study of Theoretical Foam Properties

Foam properties naturally depend on the material used, the geometry of the foam, the strain rate, and temperature, among other characteristics. However, equations derived for open and closed cell foams with struts arranged like a cube that describe the basic properties have some similarities and can be used to provide some theoretical limits on the properties of the foams of the instant invention. (See, L G Gibson (1997) cited above.) First, the Young's modulus of foams is most generally described by EQ 2 below:

$$\frac{E^*}{E_s} \approx \varphi^2 \left(\frac{\rho^*}{\rho_s}\right)^2 + (1-\varphi)\frac{\rho^*}{\rho_s} + \frac{P_{internal}(1-2v^*)}{E_s\left(1-\frac{\rho^*}{\rho_s}\right)} \quad \text{(EQ. 2)}$$

All terms are used for closed cell foams, but the internal pressure variable is not used for open cell foams. The final term accounts for internal cell pressure (notice that the stiffness of the foam will increase as the internal bubble pressure increases). With regard to the other terms, $E^*$ and $E_s$ are the Young's modulus of the foam and the bulk solid respectively, $\varphi$ is the volume fraction of material contained in the cell edges, $\rho^*$ and $\rho_s$ are the density of the foam and bulk solid respectively, $P_{internal}$ is the internal pressure of a cell, and $v^* \approx 1/3$ is the Poisson ratio of the foam.

The first term of EQ. 3 reveals a quadratic dependence of Young's modulus in open cell foams on relative density ($\rho^*/\rho_s$). This causes dramatic decreases in specific stiffness as relative density is decreased. Closed cell foams with a large volume fraction of material in cell faces have $\varphi \ll 1$. This leads to the quadratic term approaching zero. Closed cell foams should show a nearly linear dependence on relative density due to the second term of EQ. 2. This stiffness is not reached in practice due to foam defects. Certain geometries of cellular structures (e.g. out of plane loaded honeycombs) also have linear dependence on $\rho^*/\rho_s$.

Figure 8:
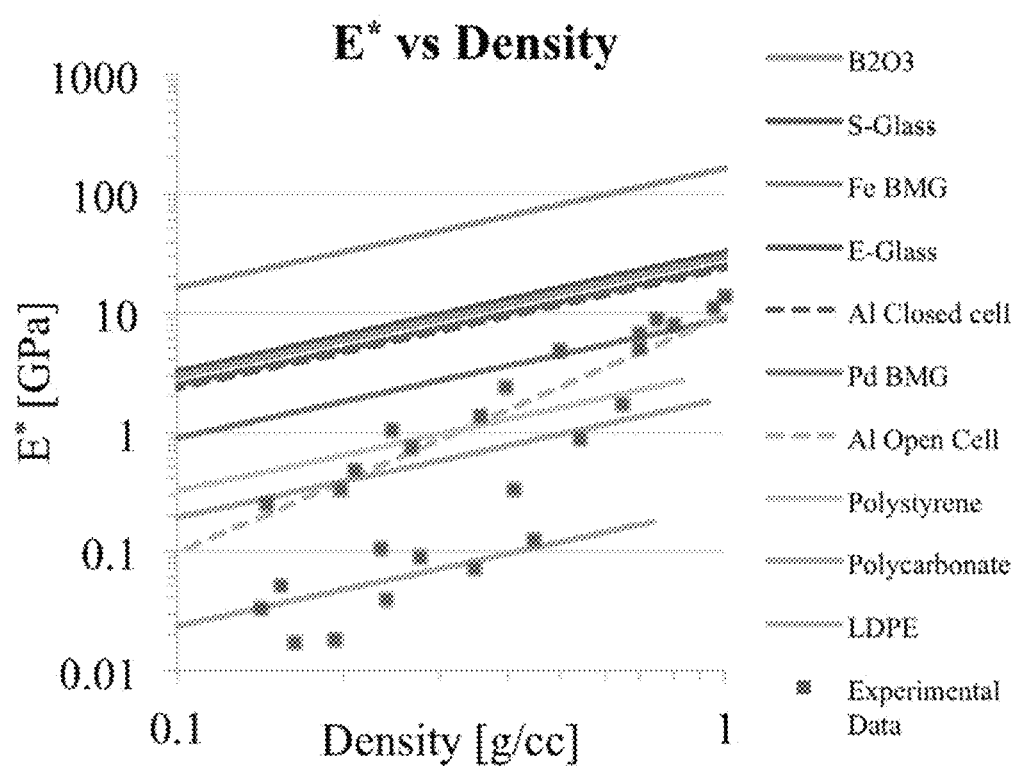
FIG. 8 provides plots of theoretical Young's modulus (E*) vs. density for hollow sphere foams made of materials with $T_g$ (Silicate (E-Glass and S-Glass) and Oxide ($B_2O_3$) glasses were assumed to be brittle foams while BMG and plastic materials were assumed to be plastic foams, $\varphi$=0.1 is assumed for all spherical foams since most of the volume fraction of material would be in the faces of the foam), also a comparison of experimental data (square points) from (M F Ashby, (2003) cited above) for commercially available aluminum foams and theoretical E* of open and closed cell aluminum foams (dashed lines) reveals that commercially available aluminum foams do not attain the theoretical E*.

Using the foam fabrication method in this proposal, open cell structures would consist of spherical closed cells bonded together at contact points. This geometry creates channels of access to the foams high surface area while maintaining much of the stiffness and strength of closed cell foams. (See, W S Sanders, L J Gibson, Mat. Sci. Eng. A 347 (2003) 70, the disclosure of which is incorporated herein by reference.) FIG. 8 shows theoretical Young's modulus versus density plots of hollow sphere amorphous foams compared to theoretical Young's modulus of closed and open cell aluminum foam. This is overlaid with experimental data from commercially available aluminum foams taken from Ashby's Metal Foams: A Survey. (M F Ashby (2003) cited above.)

Closed cell foams are also higher than open cell foams as seen in EQ. 3. As with EQ. 2, the second linear term dominates the yield strength in closed cell foams.

$$\frac{\sigma^*}{\sigma_{ys}} = A*\left(\varphi*\frac{\rho^*}{\rho_s}\right)^{3/2} + B*(1-\varphi)\frac{\rho^*}{\rho_s} + \frac{P_{internal} - P_{atm}}{\sigma_{ys}} \quad (EQ. 3)$$

Again, all terms are used for closed cell foams, but the internal pressure terms are not used for open cell foams. The final term accounts for internal cell pressure (notice that the strength of the foam will increase as the internal bubble pressure increases). With regard to the other terms, $\sigma^*$ and $\sigma_{ys}$ are the yield fracture stress of the foam and bulk solid respectively, $A \approx 0.3$ for foams made of material that yields plastically ($A \approx 0.2$ for brittle foams), $B \approx 0.4$ for foams made of material that yields plastically ($B \approx 1$ for brittle foams) (see, L J Gibson, (1997) cited above), $P_{atm}$ is the external or atmospheric pressure, and the other variable are as defined before.

A hollow sphere has a maximum internal pressure it can withstand before rupturing. This pressure can be estimated by using a result from thin wall pressure vessel theory and an approximation of the relative density of a thin wall hollow sphere, as follows:

Pressure vessel equation:

$$\sigma = \frac{Pr}{2t}$$

Relative density equation:

$$\frac{\rho^*}{\rho_s} = \frac{3t}{r}$$

where P is the internal pressure, r is the radius and t is the thickness with other variables defined as above. Combining these two equations and setting $\sigma = \sigma_{ys}$ gives:

$$P_{max} = \frac{2}{3}\frac{\rho^*}{\rho_s}\sigma_{ys} \quad (EQ. 4)$$

Inserting this result into EQ. 3 and assuming $P_{max}$ is much greater than $P_{atm}$ approximates the maximum relative strength achievable for a given relative density for a given material in accordance with:

$$\frac{\sigma^*}{\sigma_{ys}} = A*\left(\varphi*\frac{\rho^*}{\rho_s}\right)^{3/2} + B*(1-\varphi)\frac{\rho^*}{\rho_s} + \frac{2}{3}\frac{\rho^*}{\rho_s} \quad (EQ. 5)$$

Closed cell foams with a high volume fraction of material in the cell faces have a linear dependence on relative density as opposed to the 3/2 power dependence of open cell foams [See, L J Gibson, (1997) cited above]. Depending on cellular solid geometry, other relative density exponential dependencies exist. Packing spheres into specific cellular geometries may allow further tailoring of foam properties. (See, W S Sanders, L J Gibson, Mat. Sci. Eng. A 352 (2003) 150, the disclosure of which is incorporated herein by reference.)

Bulk oxide, silicate, and metallic glasses are known for brittle fracture. Weibull statistics describe the scatter in failure stresses of brittle materials by assuming a critical flaw distribution. Thin walled sections and small diameter fibers exhibit high yield strengths due to the low probability of a critical flaw existing in the volume. (See, Y Y Zhao, Evan Ma, J Xu, Scripta Mater. 58 (2008) 496, the disclosure of which is incorporated herein by reference.) In the case of metallic glasses, high compressive and bending plasticity evidenced by shear bands has been observed. (See, R D Conner, W L Johnson, N E Paton, W D Nix, J. Appl. Phys 94 (2003) 904, the disclosure of which is incorporated herein by reference.) The internal cell pressurization term in EQ. 2 is negligible for pressures up to 10% of the burst strength of hollow spheres assuming thin wall pressure vessel theory, but makes a larger contribution toward yield strength in EQ 3.

Figure 9:
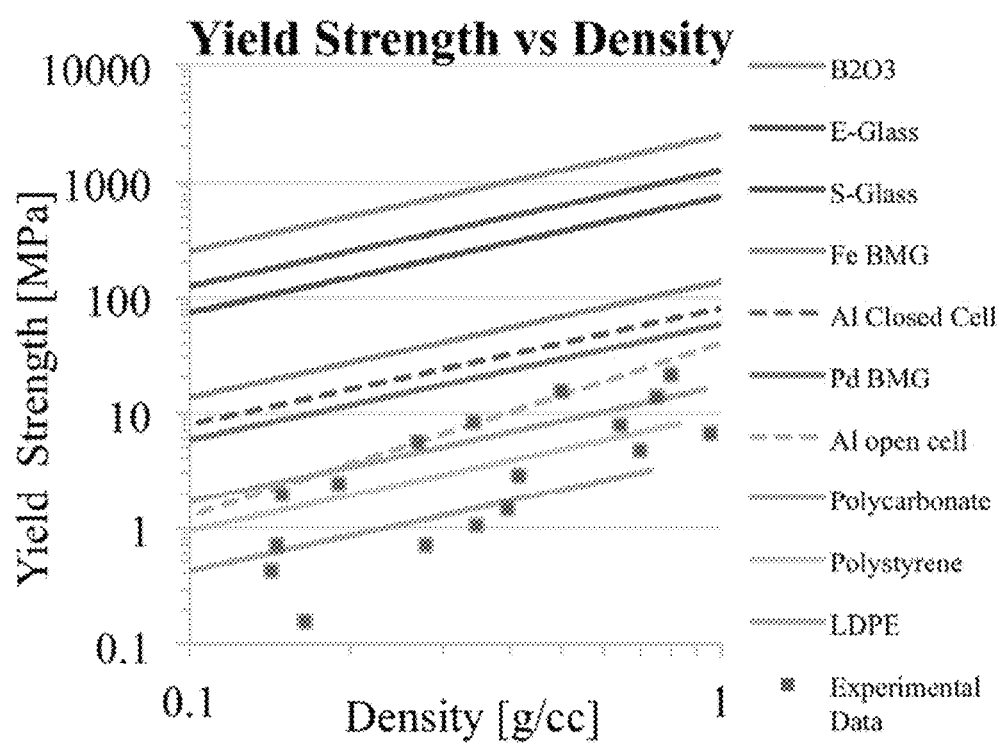
FIG. 9 provides plots of theoretical yield strength vs. density for hollow sphere foams made of materials with $T_g$. The same assumptions were made as in FIG. 3. The tensile yield strength of fibers of the brittle materials is used for the bulk fracture strength. Comparison of experimental data (square points) from (M F Ashby, (2003) cited above) for commercially available aluminum foams and theoretical yield strength of open and closed cell aluminum foams (dashed lines) reveals that commercially available aluminum foams do not attain the theoretical yield strengths. Pressurization of hollow spheres would result in increases in yield strength.

FIG. 9 shows theoretical yield/fracture stress vs. density plots of hollow sphere foams compared to theoretical yield stress of closed and open cell aluminum foam. This is overlaid with experimental data from commercially available aluminum foams taken from. (See, M F Ashby, (2003) cited above.)

These calculations indicate that foams and cellular solids made with the proposed method will achieve theoretical strengths and stiffnesses that are greatly improved over conventional materials. As shown, one end of the spectrum is occupied by stochastic foams plagued by uneven cell sizes and wall thicknesses due to the conventional manufacturing methods involving dissolved blowing agents or injection of gasses into molten material. (See, L P Lefebvre, (2008) cited above.) Cellular solids made by bonding corrugated sheets or constructed from intricate wire or strut geometries are far more regular and can approach theoretical properties. (See, L J Gibson, (1997) cited above.) The proposed method will likely mirror the predictable properties of engineered cellular structures and have very uniform cell sizes due to the high uniformity and surface quality of the hollow spheres. (See, W S Sanders, (2003), cited above.) Spheres with diameters from 50 μm to 4 mm have been fabricated with the method described in U.S. Pat. No. 4,568,389 (the disclosure of which is incorporated herein by reference), however, not at the temperatures, pressures, or with the materials discussed in this disclosure. The proposed method would allow foams to be created with close packing geometries like HCP (Hexagonal Closed Pack) or FCC (Face Centered Cubic) with identical spheres, and higher packing efficiency could be achieved by using multiple sphere sizes. If desired, more open cellular structure geometries could be constructed and random packing of spheres could also be explored.

Example 2

Exemplary Hollow Sphere Cellular Solid

To prove the efficacy of the technique, hollow spheres of silicate glass were placed in a sealed quartz tube and heated to 1100 C for 1 hour to create the foam seen in FIGS. 10a-10d. The foam dimensions are 4 mm diameter by 25 mm long.

CONCLUSION

Many foam making methods are highly specialized and applicable to only a small class of materials such as use of titanium hydride ($TiH_2$) or calcium carbonate ($CaCO_3$) to foam aluminum alloys. The versatility of the method proposed herein arises from the many variables that can be altered, such as for example, by altering the material (with $T_g$) from which the hollow spheres are made from,
by altering the fabrication of the hollow spheres to vary their wall thickness or diameter,
by altering to control the amount of compression or expansion of the spheres at $T_g$,
by altering the packing geometry of the spheres, and
by altering the composition of the sphere's internal void.

The versatility of this method should enable fabrication of cellular structures and foams with open or closed cell geometries that far exceed specific strengths and moduli of currently available cellular materials. This is due to the high specific strengths and moduli of many amorphous materials and the dependence of foams on the properties of the parent material. Calculations of theoretical strengths and stiffnesses of foams made with this method exceed currently available metal foams by as much as two orders of magnitude. Moreover, cellular structures made from a wide variety of materials, including, silicate glass, metallic glass and oxide glasses should be achievable using this method.

DOCTRINE OF EQUIVALENTS

Those skilled in the art will appreciate that the foregoing examples and descriptions of various preferred embodiments of the present invention are merely illustrative of the invention as a whole, and that variations in the steps and various components of the present invention may be made within the spirit and scope of the invention. For example, it will be clear to one skilled in the art that additional processing steps or alternative configurations would not affect the improved properties of the foams and methods of manufacture of the current invention nor render the method/foams unsuitable for its intended purpose. Accordingly, the present invention is not limited to the specific embodiments described herein but, rather, is defined by the scope of the appended claims.

What is claimed is:

1. A method of forming a cellular solid from an amorphous material comprising,
obtaining an amorphous material exhibiting a glass transition at a glass transition temperature, and having a material yield strength greater than 500 MPa;
forming a plurality of hollow spheres wherein at least the outer surface of the sphere is formed from the amorphous material, the hollow spheres each having an internal pressure;
confining the hollow spheres within a confining body having a fixed volume and having an atmosphere;
heating the plurality of hollow spheres to a temperature above the glass transition temperature of the amorphous material; and
applying a pressure differential between the internal pressures of the plurality of hollow spheres and the pressure of the atmosphere within the confining body, wherein the internal pressures of the plurality of hollow spheres is higher than the pressure of the atmosphere within the confining body such that the plurality of hollow spheres undergo an expansion within the boundary defined by the confining body such that adjacent hollow spheres make contact to form a cellular solid.

2. The method of claim 1, wherein the plurality of hollow spheres expand until the spaces between the adjacent hollow spheres are entirely closed.

3. The method of claim 1, wherein the plurality of hollow spheres bond together upon making contact.

4. The method of claim 3, wherein the outer surfaces of the plurality of hollow spheres undergo a surface treatment that enhances the bonding of spheres at contact points.

5. The method of claim 4, wherein the surface treatment is selected from the group consisting of cleaning, etching, exposure to a plasma and processing in inert atmosphere.

6. The method of claim 1, wherein the internal pressures within the plurality of hollow spheres and the pressure of the atmosphere within the confining body are equal to each other and greater than atmospheric pressure, and the pressure differential is generated by depressurizing the atmosphere within the confining body thereby causing the plurality of hollow spheres to expand.

7. The method of claim 1, wherein the pressure of the atmosphere within the confining body is greater than the internal pressures within the plurality of hollow spheres, and wherein the pressure of both are greater than atmospheric pressure, and the pressure differential is generated by depressurizing the atmosphere within the confining body thereby causing the plurality of hollow spheres to expand.

8. The method of claim 1, wherein the internal pressures within the plurality of hollow spheres and the pressure of the atmosphere within the confining body are both equal to or less than atmospheric pressure, and the pressure differential is generated by exposing the atmosphere within the confining body to a lower pressure thereby causing the plurality of hollow spheres to expand.

9. The method of claim 1, wherein the internal pressures within the plurality of hollow spheres is greater than the pressure of the atmosphere within the confining body such that when the plurality of hollow spheres are heated above the glass transition temperature the plurality of hollow spheres expand as the internal pressure within the plurality of hollow spheres and the atmosphere within the confining body move toward equilibrium.

10. The method of claim 1, wherein at least two of the plurality of hollow spheres have different internal pressures.

11. The method of claim 1, wherein at least two of the plurality of hollow spheres are formed in at least two sizes.

12. The method of claim 1, wherein at least two of the plurality of hollow spheres have at least two wall thicknesses.

13. The method of claim 1, wherein a non-amorphous material is included in one of either the inside volume of the plurality of hollow spheres or within the confining body.

14. The method of claim 1, wherein the internal volume of the plurality of hollow spheres are filled with a material reactive to the amorphous material.

15. The method of claim 1, wherein the plurality of hollow spheres are formed in an inert atmosphere.

16. The method of claim 1, wherein at least one of the plurality of hollow spheres has one of either a positive or negative charge thereon.

17. The method of claim 1, wherein the plurality of hollow spheres are sorted and arranged within the confining body prior to expansion.

18. The method of claim 1, further comprising inserting a ductile inclusion within the internal volumes of the plurality of hollow spheres.

19. The method of claim 1, wherein the plurality of hollow spheres are submerged in a pressurized fluid and the plurality of hollow spheres compressed until the internal pressures of the plurality of hollow spheres equals the pressure of the fluid such that the plurality of hollow spheres have internal pressures greater than the initial pressure.

20. The method of claim 1, wherein at least two of the plurality of hollow spheres are filled with different gasses.

21. The method of claim 1, wherein at least two of the plurality of hollow spheres are formed of different amorphous materials.

22. The method of claim 1, wherein the plurality of hollow spheres include one of either a liquid or solid blowing agent.

* * * * *